(12) United States Patent
Luick

(10) Patent No.: US 6,314,493 B1
(45) Date of Patent: Nov. 6, 2001

(54) BRANCH HISTORY CACHE

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/018,688

(22) Filed: Feb. 3, 1998

(51) Int. Cl.⁷ .................................................. G06F 13/00
(52) U.S. Cl. .................... 711/137; 711/203; 711/204; 712/240
(58) Field of Search .................. 711/117, 119, 711/120, 123, 128, 137, 169, 203, 204; 712/240, 215, 206, 244, 24, 237, 238, 239

(56) References Cited

U.S. PATENT DOCUMENTS

| | | | |
|---|---|---|---|
| 3,626,427 | 12/1971 | MacSorley et al. | 712/244 |
| 3,671,942 | 6/1972 | Knollman et al. | 708/139 |
| 4,068,305 | 1/1978 | Cutler | 711/108 |
| 4,200,926 | 4/1980 | Cochran et al. | 710/67 |
| 4,561,051 | 12/1985 | Rodman et al. | 711/152 |
| 4,587,610 | 5/1986 | Rodman | 711/207 |
| 4,679,141 | * 7/1987 | Pomerene et al. | 712/240 |
| 4,747,043 | 5/1988 | Rodman | 711/124 |
| 4,750,154 | 6/1988 | Lefsky et al. | 365/189.04 |
| 4,760,519 | 7/1988 | Papworth et al. | 712/217 |
| 4,761,755 | 8/1988 | Ardini, Jr. et al. | 708/518 |
| 4,777,594 | 10/1988 | Jones et al. | 712/240 |
| 4,794,517 | 12/1988 | Jones et al. | 712/32 |
| 4,833,599 | 5/1989 | Colwell et al. | 712/24 |
| 4,847,755 | 7/1989 | Morrison et al. | 712/203 |
| 4,894,772 | * 1/1990 | Langendorf | 712/240 |
| 4,920,477 | 4/1990 | Colwell et al. | 711/207 |
| 4,991,080 | * 2/1991 | Emma et al. | 712/206 |
| 5,021,945 | 6/1991 | Morrison et al. | 712/216 |
| 5,029,069 | 7/1991 | Sakamura | 712/234 |
| 5,051,940 | 9/1991 | Vassiliadis et al. | 708/524 |
| 5,053,986 | 10/1991 | Ahsan et al. | 708/520 |
| 5,057,837 | 10/1991 | Colwell et al. | 341/55 |
| 5,081,574 | 1/1992 | Larsen et al. | 712/234 |
| 5,081,575 | 1/1992 | Hiller et al. | 710/132 |
| 5,119,324 | 6/1992 | Ahsan | 708/520 |

(List continued on next page.)

FOREIGN PATENT DOCUMENTS

| | | | |
|---|---|---|---|
| 0474297 | 3/1992 | (EP) | G06F/9/38 |
| 0479390 | 4/1992 | (EP) | G06F/9/38 |
| 0605927 | 7/1994 | (EP) | G06F/9/38 |

Primary Examiner—Matthew Kim
Assistant Examiner—Fred F. Tzeng
(74) Attorney, Agent, or Firm—Birch, Stewart, Kolasch & Birch; Thomas S. Auchterlonie

(57) ABSTRACT

Disclosed is a predictive instruction cache system, and the method it embodies, for a VLIW processor. The system comprises: a first cache; a real or virtual second cache for storing a subset of the instructions in the second cache; and a real or virtual history look-up table for storing relations between first instructions and second instructions in the second cache. If a first instruction is located in a stage of the pipeline, then one of the relations will predict that a second instruction will be needed in the same stage a predetermined time later. The first cache can be physically distinct from the second cache, but preferably is not, i.e., the second cache is a virtual array. The history look-up table can also be physically distinct from the first cache, but preferably is not, i.e., the history look-up table is a virtual look-up table. The first cache is organized as entries. Each entry has a first portion for the first instruction and a second portion for a branch-to address indicator pointing to the second instruction. For a given first instruction, a new branch-to address indicator independently can be stored in the second field to replace an old branch-to address indicator and so reflect a revised prediction. Alternatively, redundant data fields in the parcels of the VLIWs are used to store the branch-to address guesses so that a physically distinct second portion can be eliminated in the entries of the first cache.

33 Claims, 8 Drawing Sheets

U.S. PATENT DOCUMENTS

| | | | |
|---|---|---|---|
| 5,127,092 | 6/1992 | Gupta et al. | 712/234 |
| 5,175,824 | 12/1992 | Soderbery et al. | 710/132 |
| 5,179,680 | 1/1993 | Colwell et al. | 711/125 |
| 5,182,811 | 1/1993 | Sakamura | 710/264 |
| 5,197,135 | 3/1993 | Eickemeyer et al. | 712/217 |
| 5,197,137 | 3/1993 | Kumar et al. | 709/107 |
| 5,201,039 | 4/1993 | Sakamura | 711/201 |
| 5,201,057 | 4/1993 | Uht | 712/18 |
| 5,204,841 | 4/1993 | Chappell et al. | 365/230.05 |
| 5,214,763 | 5/1993 | Blaner et al. | 712/212 |
| 5,222,221 | 6/1993 | Houri et al. | 709/106 |
| 5,222,229 | 6/1993 | Fukuda et al. | 709/400 |
| 5,261,066 | 11/1993 | Jouppi et al. | 711/122 |
| 5,274,790 | 12/1993 | Suzuki | 711/133 |
| 5,276,821 | 1/1994 | Imai et al. | 712/214 |
| 5,287,467 | 2/1994 | Blaner et al. | 712/235 |
| 5,295,249 | 3/1994 | Blaner et al. | 712/213 |
| 5,299,319 | 3/1994 | Vassiliadis et al. | 712/221 |
| 5,299,321 | 3/1994 | Iizuka | 712/212 |
| 5,301,340 | 4/1994 | Cook | 712/24 |
| 5,303,356 | 4/1994 | Vassiliadis et al. | 712/238 |
| 5,303,357 | 4/1994 | Inoue et al. | 717/9 |
| 5,307,506 | 4/1994 | Colwell et al. | 710/127 |
| 5,313,551 | 5/1994 | Labrousse et al. | 711/149 |
| 5,317,718 | 5/1994 | Jouppi | 711/137 |
| 5,317,734 | 5/1994 | Gupta | 717/6 |
| 5,333,280 | 7/1994 | Ishikawa et al. | 712/241 |
| 5,347,639 | 9/1994 | Rechtschaffen et al. | 712/203 |
| 5,355,335 | 10/1994 | Katsuno | 365/189.04 |
| 5,355,460 | 10/1994 | Eickemeyer et al. | 712/215 |
| 5,359,718 | 10/1994 | Phillips et al. | 712/221 |
| 5,361,385 | 11/1994 | Bakalash | 345/424 |
| 5,367,694 | 11/1994 | Ueno | 712/23 |
| 5,384,722 | 1/1995 | Dulong | 708/201 |
| 5,386,562 | 1/1995 | Jain et al. | 717/9 |
| 5,398,321 | 3/1995 | Jeremiah | 712/216 |
| 5,404,469 | 4/1995 | Chung et al. | 712/215 |
| 5,408,658 | 4/1995 | Rechtschaffen et al. | 712/216 |
| 5,412,784 | 5/1995 | Rechtschaffen et al. | 712/245 |
| 5,414,822 | 5/1995 | Saito et al. | 712/240 |
| 5,420,809 | 5/1995 | Read et al. | 708/200 |
| 5,421,022 | 5/1995 | McKeen et al. | 712/23 |
| 5,426,743 | 6/1995 | Phillips et al. | 712/221 |
| 5,428,807 | 6/1995 | McKeen et al. | 712/216 |
| 5,434,972 | 7/1995 | Hamlin | 709/238 |
| 5,805,850 * | 9/1998 | Luick | 712/215 |
| 5,809,450 * | 9/1998 | Chrysos et al. | 702/186 |
| 5,890,009 * | 3/1999 | Luick et al. | 712/24 |
| 5,923,872 * | 7/1999 | Chrysos et al. | 712/244 |
| 6,000,044 * | 12/1999 | Chrysos et al. | 714/47 |

\* cited by examiner

BRANCH HISTORY CACHE

FIELD OF THE INVENTION

The invention is directed to a cache system for a computer. More particularly, the invention is directed toward an improved instruction cache (Icache) system having a specialized cache memory known as a branch history cache for use with a conventional Icache.

BACKGROUND OF THE INVENTION

Computer processors process information faster than the information can be supplied to the them. Much effort has been directed toward reducing latency, i.e., reducing the time that a processor is idle while waiting for the information it needs to proceed.

The technique of multi-level caching of instructions and/ or data has been developed to reduce latency. Caches are fast memories of varying speeds, located in close proximity to the processor, that store instructions and/or data with a high probability of being needed by the processor. A level one or L1 cache is physically located closest to the processor, retrieves information the fastest, but also is the most expensive (in terms of the number of memory cells provided per unit of chip surface area), and hence also is the smallest of the caches. The next level of cache, L2, does not retrieve information as fast, is less expensive per unit area, and is larger than the L1 cache. If present, an L1.5 cache is located between the L1 and L2 cache, is smaller, faster and more expensive than the L2 cache, and bigger, slower and less expensive than the L1 cache.

Another technique for reducing latency is to prefetch or load instructions to the L2 instruction cache (Icache) before the processor attempts to retrieve them from the Icache to increase the likelihood that the instructions will be in the Icache when needed. This entails inspecting instructions that will be executed two or three cycles in the future, and determining if a branch to an instruction other than the subsequent serial instruction will take place. If no branch will take place, then the instruction serially subsequent to the inspected instruction will be loaded into the L2 Icache. If branching will take place either because the branch is an unconditional branch or a conditional branch of a loop, then the branched-to instruction is fetched. The essential characteristic of prefetching is the determination of whether a simple branch will occur.

One fast computer architecture is a hybrid architecture having a single CPU with characteristics of both a uniprocessor and a parallel machine. In this approach, a single instruction register and instruction sequence unit execute programs under a single flow of control, but multiple arithmetic/logic units (ALUs) within the CPU can each perform primitive operations simultaneously. Rather than relying upon hardware to determine all the simultaneous operations that can be executed, a compiler formats or groups the instructions before execution to specify the parallel operations. Because the instruction word held in the instruction register must specify multiple independent operations to be performed by the different ALUs, this approach employs a very long instruction word, and is commonly known as very long instruction word (VLIW) architecture.

A central processing unit (CPU) of a computer system utilizing a VLIW architecture includes an instruction register large enough to hold a VLIW, an instruction sequencing unit, a bank of data registers, a set of arithmetic/logic units (ALUs), and instruction decode logic. The instruction register holds machine-level instructions for execution by the CPU. The bit positions in the instruction register correspond to a set of parcels or fields, each parcel corresponding to a different respective one of the ALUs. The operation, if any, performed by each ALU during a machine cycle is specified by the corresponding parcel.

Each parcel of an instruction in the instruction register may contain such information as an operation code (op code), source and destination registers, special registers such as condition code registers, immediate data, storage addresses, etc. In order to reduce the total number of bits required to store an instruction, at least some of the bit positions required to specify such information to the instruction decode logic are implied by the position of the parcel within the instruction word.

A VLIW architecture, can in many applications, achieve greater parallelism and greater speed than multiple independent processors operating in parallel. The theory underlying VLIW is that the typical application program has a single flow of control, but many of the primitive operations within that flow can be performed in parallel. Therefore an automated compiler for a VLIW machine does not have to alter program flow (something which has been almost impossible to automate in parallel processor machines). It only has to determine which primitive operations can be performed in parallel. While even this is a difficult task in practice, it lends itself to automation much more readily than the altering of program flow.

VLIW designs employ a large instruction word for several reasons. First, each of the ALUs requires its own command, which can include an operation code, source and destination designations, etc. Second, there must be a conditional branching mechanism appropriate to the VLIW architecture. Because many simple operations are being performed with each instruction, the effectiveness of a VLIW machine would be limited if only one conditional branch were allowed in a given instruction, as is usually the case in a conventional von Neumann computer. Therefore it is desirable to permit conditional branching to multiple destinations from a single VLIW instruction, a characteristic referred to as N-way branching. Of course, all of the branch conditions and destinations must in some way be specified in the instruction. Third, because a theoretically pure VLIW design employs a large pool of data registers, and other special registers, any of which can be assigned arbitrarily as source or destination for the various operations, the number of bits in the instruction required for identifying each source and destination register is greater than for a conventional von Neumann design employing a smaller number of registers.

With the development of Very Long Instruction Word (VLIW) computers, much greater demands have been placed upon the supporting hardware, such as memory, buses, etc., but especially instruction cache (Icache). A VLIW computer drains an Icache about five times faster than a conventional von Neumann computer because of the parallelism inherent to VLIW computation.

About half of the instructions in a VLIW ultimately contribute no useful work to the processor. As a result, compared to an Icache holding instructions of a von Neumann computer, an Icache holding VLIWs holds about 50% less instructions that are likely to contribute useful work. Yet this situation is tolerable because of the massive parallelism achieved.

As alluded to above, it is a characteristic of VLIW computers that each VLIW has at least one branch target, and usually two or three. It is difficult to predict if the typical VLIW will cause a branch to occur, and if so, what will be the address to which the branch goes. It is a problem that, when a typical VLIW branches, the latency associated with retrieving the branched-to VLIW into the pipeline causes the processor to slow significantly.

OBJECTS OF THE INVENTION

It is an object of the invention to provide a cache system that overcomes the problem of the latency associated with retrieving a branched-to VLIW into the pipeline.

It is an object of the invention to provide a cache system that predicts an address of the VLIW to which another VLIW will branch so that the branched-to VLIW can be loaded into the pipeline by the time that the actually branched-to VLIW address becomes available.

SUMMARY OF THE INVENTION

The objects of the invention are fulfilled by providing a specialized cache memory known as a branch history cache, and the method embodied therein, for use with a conventional Icache.

The objects of the invention are fulfilled by providing a cache system, and the method embodied therein, for a processor, preferably a VLIW processor, having a multi-stage execution pipeline, the system comprising: a first cache, preferably an L2 cache, for storing instructions that can be executed in the pipeline, also referred to as an instruction cache (Icache); a real or virtual second cache, also referred to as a branch history cache (BHC), for storing a subset of the instructions in the first cache; and a real or virtual history look-up table (look-up table) for storing a plurality of relations, each one of the relations relating a first instruction to a second instruction in the second cache such that if the first instruction is in a stage of the pipeline then the second instruction is predicted to be needed in the stage of the pipeline a predetermined time later, e.g., two or four cycles.

One embodiment of the invention establishes the Icache as having physically distinct storage locations from the branch history cache.

The objects of the invention are more preferably fulfilled by providing a combined or integrated conventional Icache and branch history cache, and the method embodied therein, that reflects the recognition that the branch history cache can be virtual because the information stored in the branch history cache is redundant to the L2 Icache. The branch history cache is not physically distinct from the Icache. Rather, the branch history cache is a virtual array, the subset of instructions being virtually stored in the branch history cache but physically stored in the Icache.

The objects of the invention are fulfilled by organizing the history look-up table to represent the relations as a plurality of entries. Each one of the entries includes an address of the first instruction and a branch-to address indicator indicating an address of the second instruction. The system also includes a directory for the Icache and a comparator. The directory provides an output equal to the actual branch-to address if a corresponding branch-to instruction is stored in the Icache, and an output equal to a third signal indicating that no instruction corresponding to the actual branch-to address is stored in the Icache if the corresponding branch-to instruction is not stored in the Icache. The comparator compares a guess, represented by one of the branch-to address indicators, with output from the directory and provides an output indicative of a correct guess if the guess matches the output from the directory, and an output indicative of an incorrect guess if the guess does not match the output from the directory.

The objects of the invention are fulfilled by providing a selector for selecting either the guess or the actual branch-to address. The selector connects the guess to the comparator for the comparison operation that will determine the correctness of a guess. The selector alternatively connects the actual branch-to address to the comparator. The comparator can also compare the actual branch-to address with the output from the directory. If the actual branch-to address matches the output from the directory, then the comparator provides an output indicative of a hit. If the actual branch-to address does not match the output from the directory, then the comparator provides an output indicative of a miss.

The Icache, the branch history cache and the history look-up table, are preferably organized as four-way associative arrays.

The objects of the invention are fulfilled by providing the history look-up table as a structure physically distinct from the Icache. More preferably, the history look-up table is not physically distinct from the Icache. Rather, the history look-up table is a virtual look-up table. The Icache is organized as entries. Each entry has a first portion for the first instruction and a second portion for a branch-to address indicator pointing to the second instruction predicted to be needed in the stage of the pipeline the predetermined time later.

Preferably, a new branch-to address indicator independently can be stored in the second portions to replace an old branch-to address indicator and so reflect a revised prediction. The second portion can store an entire real address as the branch-to address indicator, but it is preferable to economize by sizing the second portion to store only as many bits as are necessary to uniquely identify one of the basic units, e.g., a cache line, of storage in the Icache.

The objects of the invention are fulfilled by using redundant data fields in the parcels of the VLIWs to store the branch-to address guesses so that a physically distinct second portion can be eliminated in the entries of the Icache. This is achieved by controlling the compiler to cause each of the conditionally branching parcels in each one of the VLIWs to branch to the second instruction. Each one of the parcels has a plurality of fields including a multipurpose field. The multipurpose field in the second parcel stores a branch-to guess address indicator indicating an address of the second instruction. The multipurpose field in the first parcel stores a branch-to address indicator pointing toward the second instruction.

For a given first instruction, a new branch-to address indicator independently can be stored in the second field to replace an old branch-to address indicator and so reflect a revised prediction. The multipurpose fields are sized to store only as many bits as are necessary to uniquely identify one of the basic units of storage, e.g., a cache line, in the Icache.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

To deal with the latency problem of branching VLIW instructions, one could provide an L1 Icache having a unit cycle time. A conventional L2 Icache has a miss rate of about one miss for every twenty access cycles. An L1 Icache having a unit cycle time would suffer a miss every two or three access cycles. An L1 miss requires an access to the L2 Icache, which consumes five machine cycles. If an L1 Icache miss occurs one-half to one-third of the time, and each miss necessitates a five machine cycle recovery, this is an unacceptable situation that would significantly degrade performance.

Another way to deal with the latency problem of branching VLIW instructions is to use a much larger L1 Icache than used by the conventional von Neumann processor, one that is ten times, equal to five divided by one-half based upon the discussion above, the size of a conventional L1 Icache. Such a large L1 Icache would take two or three machine cycles to be accessed, instead of the unit cycle access time desired for an L1 cache, thereby decreasing performance by fifty to sixty six percent.

The invention deals with the latency problem of branching VLIW instructions by providing system special instruction cache (Icache) capabilities, known as a branch history lookahead cache, also called a branch history cache capabilities, in association with conventional Icache capabilities. The branch history cache can be real or virtual. The branch history cache stores addresses of instructions, e.g., Very Long Instruction Words (VLIWs), that previously have been loaded into a given stage, e.g., stage 1, of an execution pipeline of a VLIW processor and that have branched. The branch history cache also stores the corresponding addresses of instructions loaded a predetermined amount of time later, e.g., two execution cycles, into the given stage of the pipeline.

The branch history cache is used to guess the VLIW that will be loaded two cycles later. In other words, the branch history cache guesses that a branched-from VLIW will branch the next time to the same branched-to VLIW as before. If the guess is wrong, this is not necessarily indicative that the branched-to VLIW is not in the associated Icache. Rather, a wrong guess indicates that the branched-from VLIW is branching to a different VLIW than it did before.

The structures of the various embodiments will be discussed below, followed by discussions of how the embodiments operate.

Structure of First Embodiment

Figure 1A:
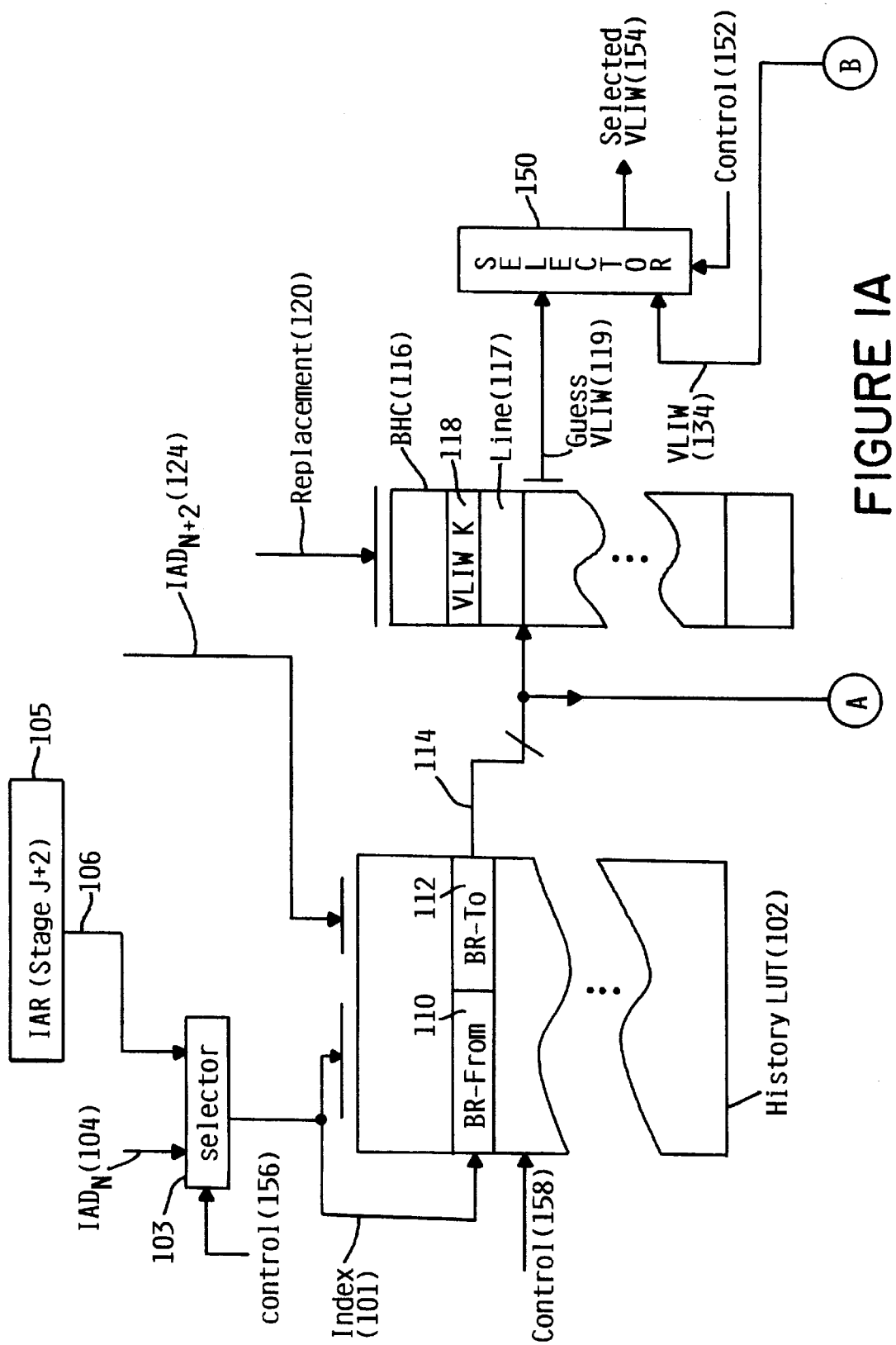
FIG. 1 depicts a first embodiment of the Icache system of the invention.
Figure 1B:
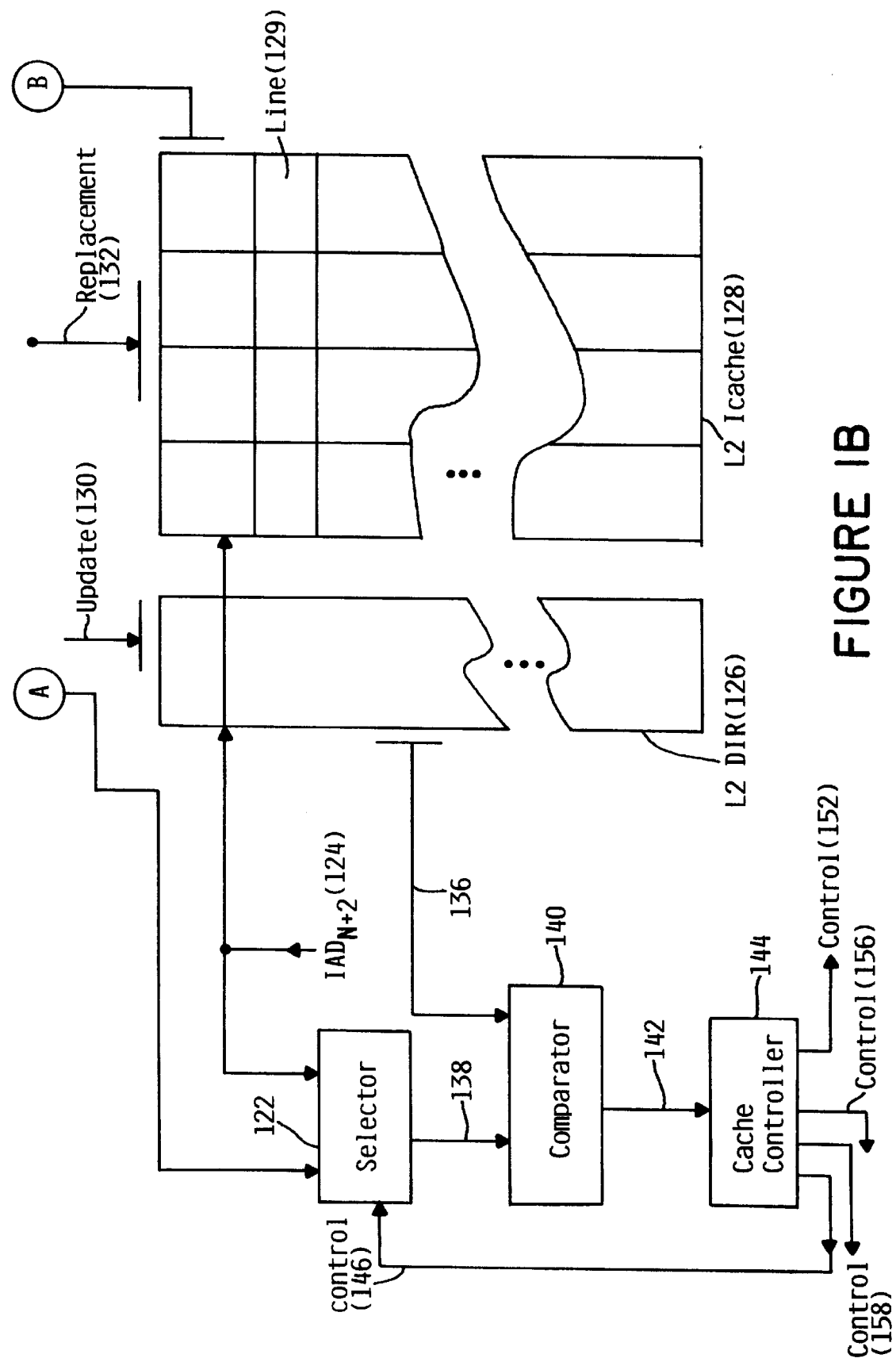

A first embodiment of the invention is depicted in FIG. 1 and includes a one-way associative branch history cache 116. The branch history cache 116 is organized as lines 117 of VLIWs stacked upon each other. Each line 117 has a predetermined number of VLIWs 118. The conventional Icache associated with the branch history cache 116 is depicted as the L2 Icache 128 in FIG. 1. The L2 Icache 128 is, e.g., four-way associative, i.e., it is organized into four units or columns of lines that are each addressed in parallel by the same real address $IAD_{N+2}$, which is an actual branch-to address determined by the pipeline. One of the four parallel lines addressed by the real address $IAD_{N+2}$ is selected in a well known manner. The real address $IAD_{N+2}$ is provided over the branch-to address signal path 124 to the L2 directory 126 and the L2 Icache 128.

An update signal path 130 provides revised or updated directory entries to the L2 directory 126 should there occur a miss. A replacement signal path 132 provides replacement cache lines to the L2 Icache 128 should there occur a miss. VLIWs from the L2 Icache 128 are provided over the Icache output signal path 134 to a selector 150.

An index signal path 101 provides an index to a one-way associative history look-up table 102 from a selector 103. The selector 103 receives a real address of the VLIW needed in stage 1 of the execution pipeline of the VLIW processor, referred to as the branching-from VLIW in the context of the invention, over the branch-from signal path 104 and a branch-from address from an instruction address register IAR(stage J+2) 105. The selector is connected via a third control signal path 156 to a cache controller 144. A fourth control signal path 158 connects the cache controller 144 to the history look-up table 102.

A guess address of a VLIW needed in, e.g., stage 1, of the pipeline of the VLIW computer is provided to the branch history cache 116 over a guess address signal path 114 from the history look-up table 102. Each entry of the history look-up table 102 is organized as a pair of a fields. The first field is the indexed VLIW real address or BR-from 110. The second field is an address of a VLIW to which it is predicted the program will branch in two cycles, namely Br-to 112.

The index signal path 101 is also provided to a write input of the history look-up table 102 for update purposes, to be discussed below. Replacement branch-to addresses, namely $IAD_{N+2}$, for update purposes are provided to the history look-up table 102 via the update signal path 124. A replacement signal path 120 provides replacement cache lines to the branch history cache 116.

The guess VLIW is output from the branch history cache 116 via the guess VLIW signal path 119 to the selector 150. The selected VLIW is output over the selected VLIW signal path 152. Selection by the selector 150 is determined by a control signal on the second control signal path 152 connecting the selector 150 to the cache controller 144.

A selector receives the guess VLIW address via the guess address signal path 114 and also receives an actual branch-to address $IAD_{N+2}$ 124. The output of the selector 122 is provided via selector output signal path 138 to a comparator 140, which also receives an output of the L2 directory via a directory output signal path 136. The output of the comparator 140 is provided to the cache controller 144 via a comparator output signal path 142. A first control signal is provided to the selector 122 from the cache controller 144 via a first control signal path 146.

The L2 Icache 128 is, e.g., two megabytes in size, can store four thousand (4 k) lines, with each line having eight VLIWs, and has a 128 byte port (not shown) that can accommodate two VLIWs. The branch history cache 116, e.g., can store thirty-two thousand (32 k) VLIWs, each VLIW being sixty-four bytes in size. As such, the branch history cache 116 is preferably the same size, or greater, than the L2 Icache 128.

The branch history cache 116 and the L2 Icache 128 are real, i.e., storage locations of the branch history cache 116 are physically distinct from storage locations of the L2 Icache 128.

Structure of Second Embodiment

Figure 2:
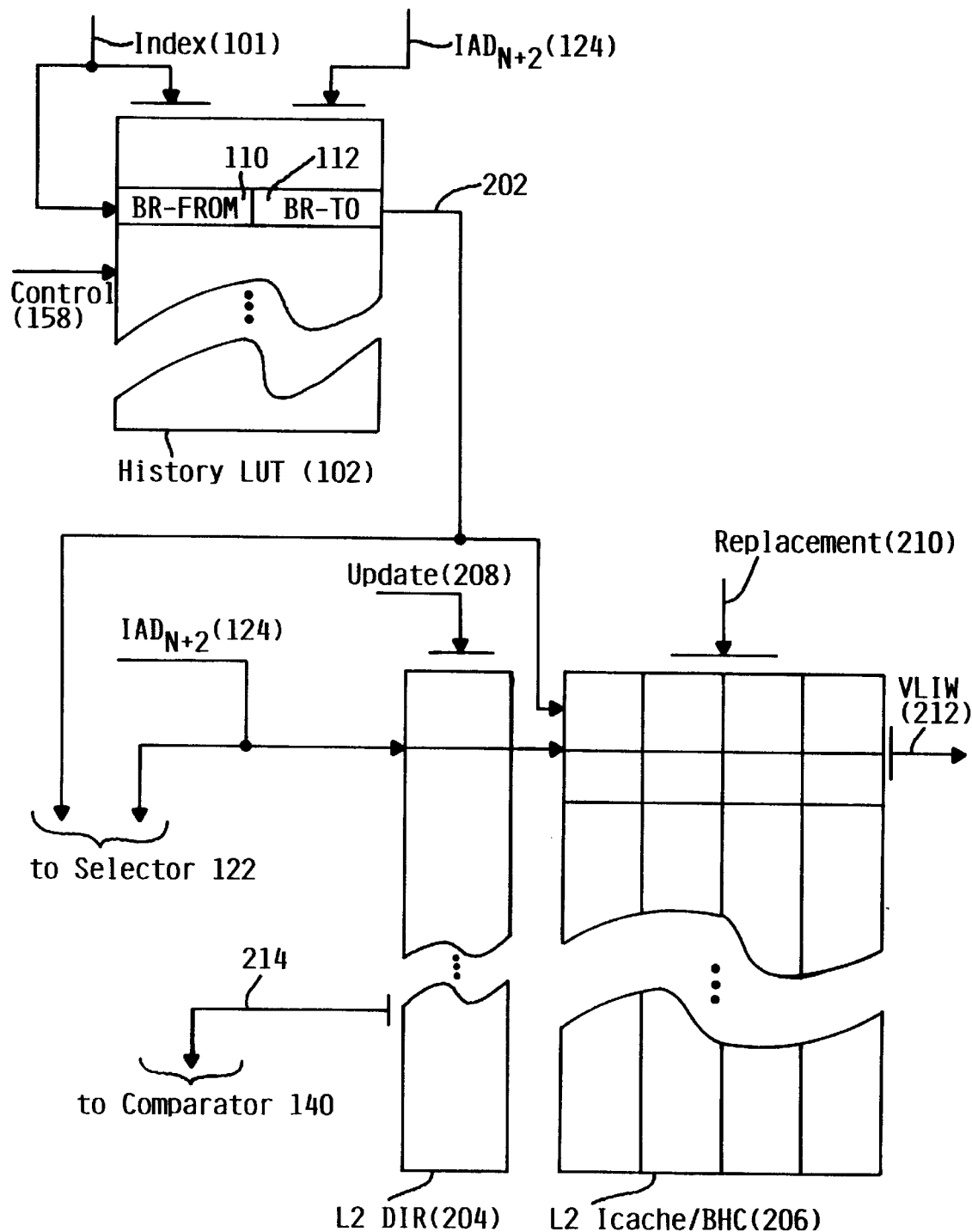
FIG. 2 depicts a second embodiment of the Icache system of the invention, and is suggested for printing on the first page of the patent.

A second embodiment of the invention is depicted in FIG. 2. FIG. 2 is similar to FIG. 1, and so only the differences between FIG. 2 and FIG. 1 will be discussed. FIG. 2 differs primarily from FIG. 1 by not including a branch history cache physically distinct from the L2 Icache. Not only is the output of the history look-up table 102 connected to the selector 122 via a guess address signal path 202, it is also connected by the guess address signal path 202 to the combined L2/branch history cache Icache 206.

An update signal path 208 provides revised or updated directory entries to the L2 directory 204 should there occur a miss. A replacement signal path 210 provides replacement cache lines to the L2/branch history cache Icache 206 should there occur a miss. An output of the L2 directory 204 is connected to one of the inputs of the comparator 140 via a directory output signal path 214.

In FIG. 2, a physically distinct branch history cache, such as the branch history cache 116 of FIG. 1, has been eliminated by recognizing that the L2/branch history cache Icache 206 can be used as the branch history cache at the same time that it serves its conventional Icache duties. This embodiment of the invention is a recognition that the instructions in the branch history cache 116 are a subset of the instructions in the L2 Icache 128, i.e., the physical storage of the instructions in the branch history cache 116 is redundant. The L2/branch history cache Icache 206 can also be considered a virtual branch history cache.

The branch history cache of FIG. 2 is virtual such that the storage locations of the branch history cache are not physically distinct from the storage locations of the L2 Icache.

Alternative Structure of History Look-up Table

Figure 3:
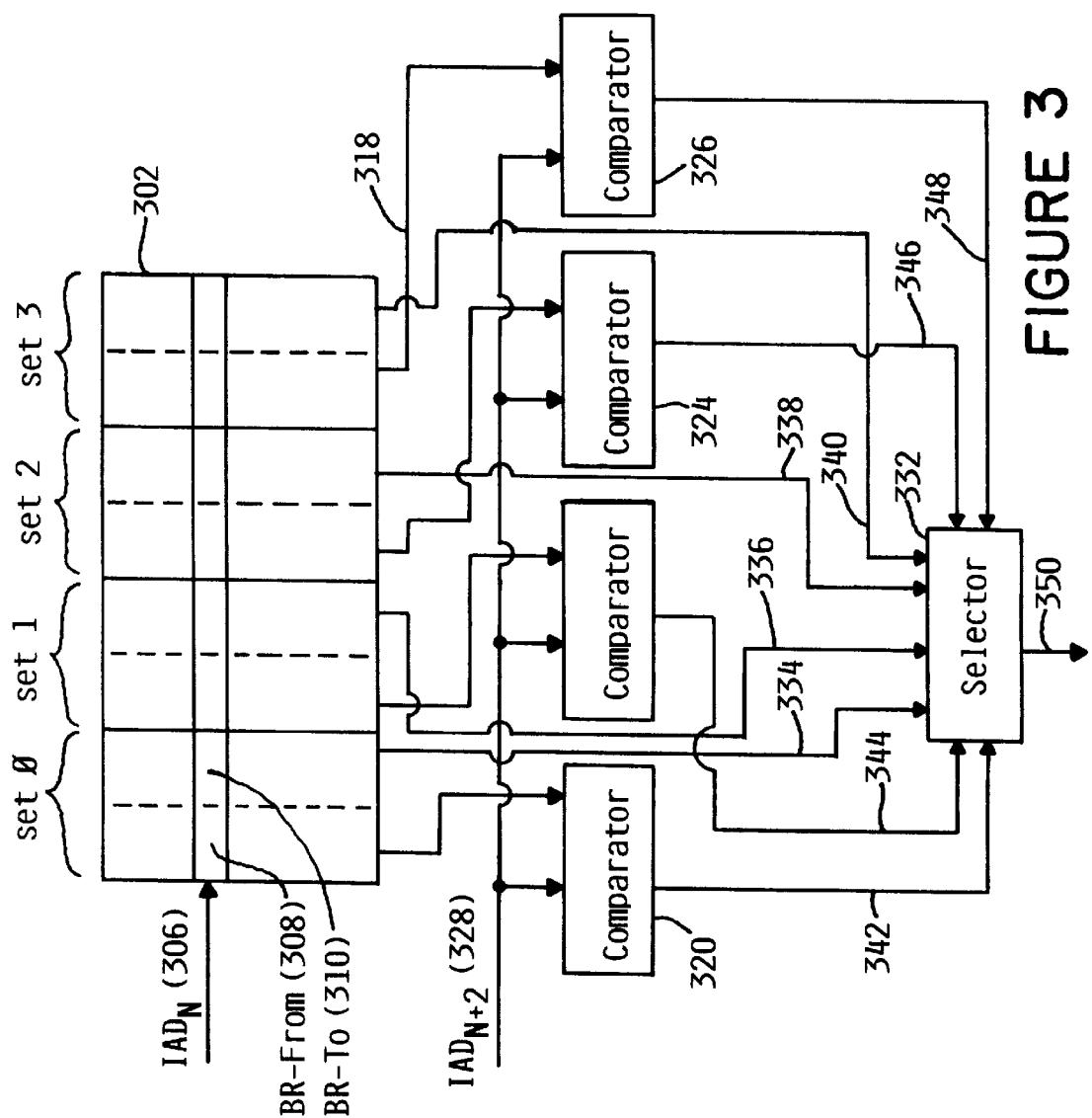
FIG. 3 depicts an alternative embodiment of the history look-up table of FIGS. 1 and 2.

An alternative and preferred implementation of the one-way associative history look-up table 102 is depicted in FIG. 3 as the four-way associative history look-up table 302, which is organized as four sets, set 0 through set 3. Each of the sets 0–3 is organized as a pair of a fields. The first field is the indexed VLIW real address or BR-from 308. The second field is an address of a VLIW to which it is predicted the program will branch in two cycles, namely Br-to 310. A branch-from signal path 306 provides the real address $IAD_N$ as an index to be applied to the BR-from 110 portions of the enties in the history look-up table 102.

The sets 0–3 provide real branch-from addresses 308 to comparators 320, 322, 324 and 326 via signal paths 312, 314, 316 and 318 respectively, and real branch-to addresses BR-to 310 to a selector 332 via signal branch-to signal paths 334, 336, 338 and 340, respectively. The real address $IAD_N$ also is provided over the branch-from signal path 328 to each of the comparators 320–326. The comparators output a comparison result signal to the selector 332 via the comparator output signal paths 342, 344, 346 and 348, respectively. The selector outputs a selected one of the real branch-to address BR-to 310 via the selector output signal path 350.

The connections to update the history look-up table 302 are very similar to the connections to update the history look-up table 102, except modified to account for there being four sets instead of one. These connections are also similar to the update connections for a conventional four-way associative cache, at least in terms of selecting the appropriate set to update.

Structure of Third Embodiment

Figure 4:
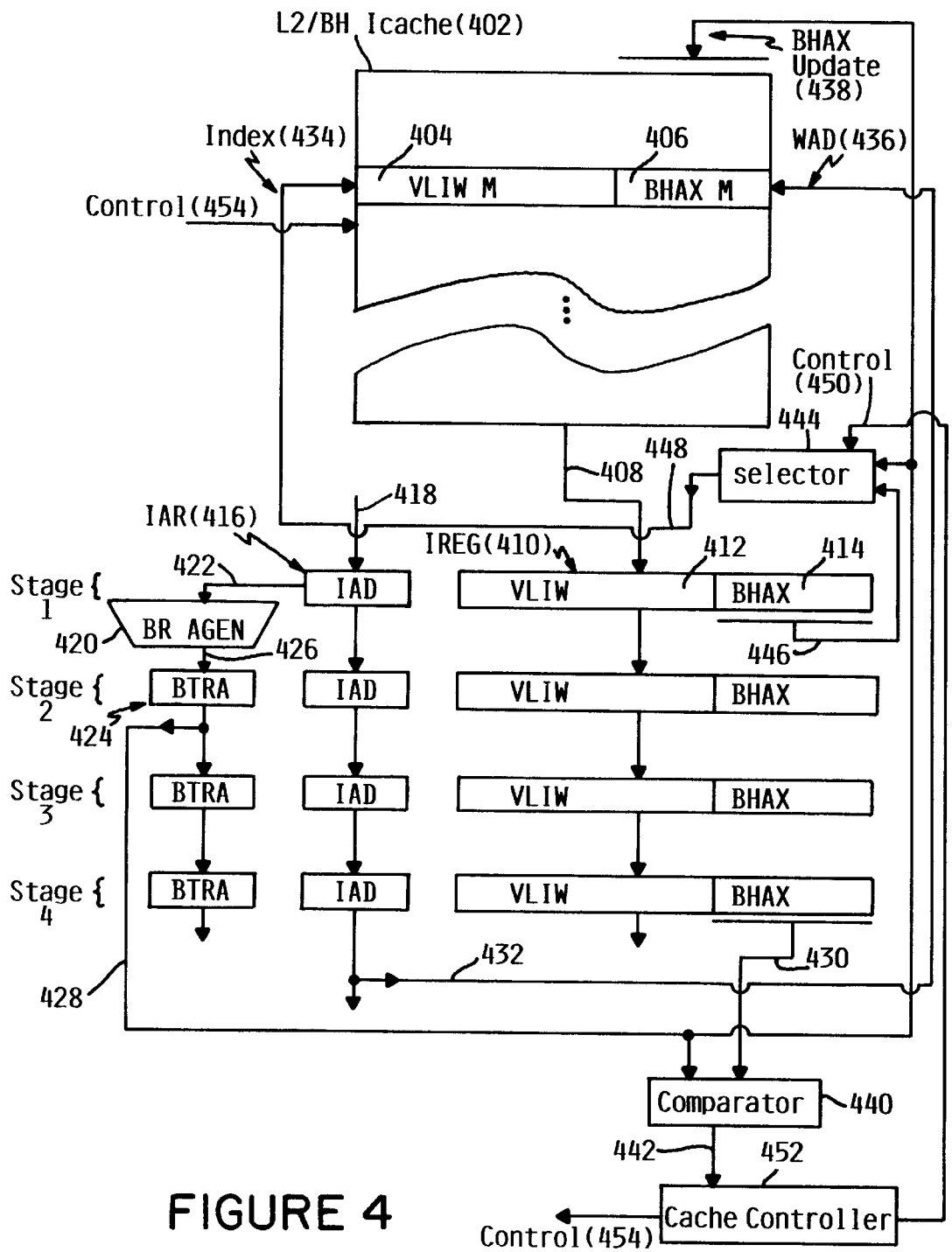
FIG. 4 depicts a third embodiment of the Icache system of the invention.

A third embodiment of the invention is depicted in FIG. 4 as a combined L2/branch history Icache 402 that incorporates the functionality of the history look-up table as well. For simplicity of illustration, the L2/branch history Icache 402 has been depicted as a one-way associative cache, but it is preferably four-way associative, e.g., as in FIG. 3. Each entry in the L2/branch history Icache stores a VLIW 404 to which is appended a corresponding branch history real address, or guess, 406. The L2/branch history Icache 402 has conventional connections (not shown) by which it is provided with replacement cache lines and by which it is accessed in the event of an L1 Icache miss.

Also in FIG. 4, cascaded stages 1, 2, 3 and 4 of the pipeline of the processor are depicted. Each stage has an instruction register IREG 410 and an instruction address register IAR 416. The instruction register 410 has a VLIW field 412 and a branch-to guess BHAX 414. The L2/branch history Icache 402 provides a VLIW/BHAX to the instruction register 410 of stage 1 via an Icache output signal path 408. The address for the VLIW in the instruction register 410 is conventionally provided to the instruction address register 416 of stage 1 via a signal path 418.

The address in the instruction address register 416 of the first stage is provided conventionally to a branch address generator BR AGEN 420, e.g., an adder for indexed-addressing, via a signal path 422. A predetermined subset of the bits in the instruction address IAD in the instruction address register 416 represents a branch offset or index. The branch address generator 420 provides a branch real address to a branch-to real address register BTRA 424 found in stage 1 via a signal path 426; similar branch-to read address registers can be found in stages 2, 3 and 4.

The output of the branch-to real address register 424 in stage 2 is provided via an actual-branch-to signal path 428 to an input of a comparator 440, to a first input of a switch 444 and to the L2/branch history Icache 402 as a BHAX update 438. The contents of the BHAX field 414 of the instruction register 410 of stage 1 are provided to a second input of the switch 444 via a guess address signal path 446. The output of the switch 444 is provided over an index signal path 448 to the L2/branch history Icache 402 as an index input 434. The output of the BHAX field 414 of stage 4 is provided to the comparator 440 via a signal path 430. The output of the instruction address register 416 of stage 4 is provided as a write address WAD 436 to the L2/branch history Icache 402 via a write address signal path 432. The output of the comparator 440 is provided via the comparator output signal path 442 as a control input 450 to the selector 444.

The history look-up table of FIG. 4 is virtual, i.e., storage locations of the history look-up table are not physically distinct from storage locations of the L2 Icache.

Alternative Structure of L2/branch History Icache

An alternative embodiment of the combined L2/branch history Icache 402 of FIG. 4, that incorporates the functionality of the history look-up table as well, is depicted in FIG.

Figure 5A:
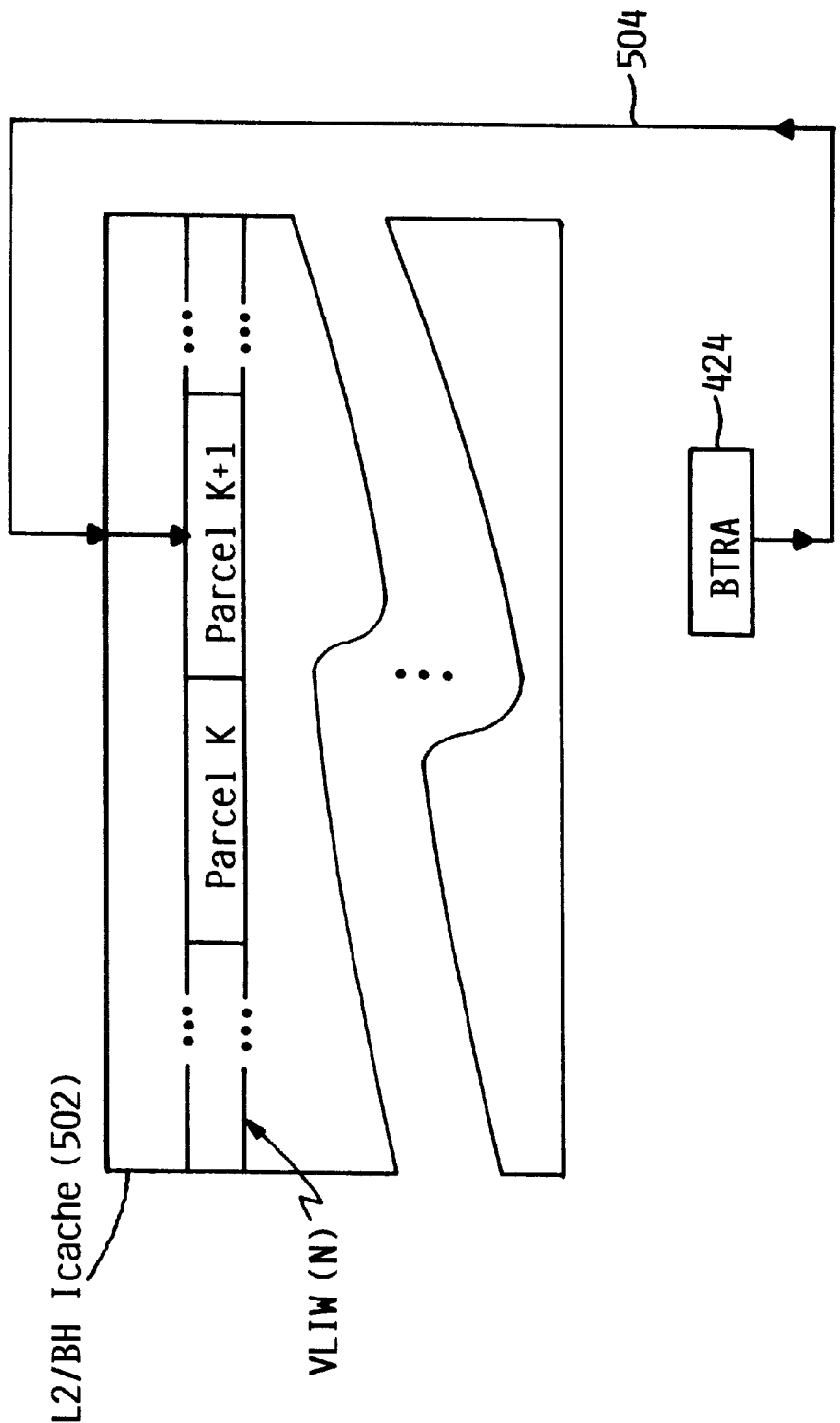
FIGS. 5A and 5B depict an alternative embodiment of the combined Icache and branch history cache of FIG. 4.

5A as L2/branch history Icache 502. For simplicity of illustration, this has been depicted as a one-way associative cache, but it is preferably four-way associative, e.g., as in FIG. 3. FIG. 5A depicts an L2/branch history Icache 502 that stores VLIWs including, e.g., the VLIW(N). The VLIW(N) has a plurality of parcels including, e.g., parcels K and K+1.

Figure 5B:
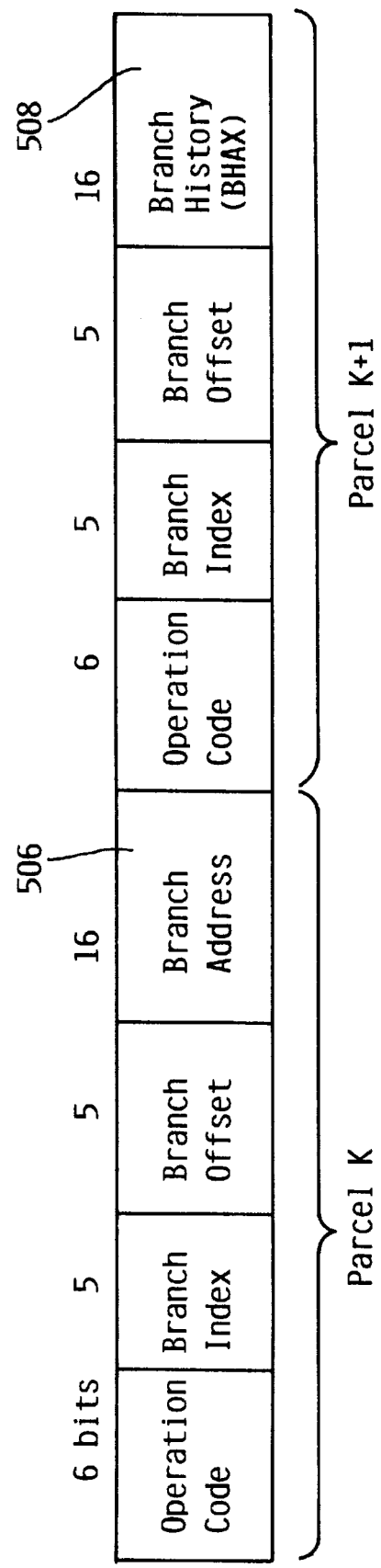

As depicted in FIG. 5B, parcel K is an example of a conventionally arranged parcel. Parcel K has an op code field, OP, a branch index field, BI, a branch offset field, BO, and branch address field, BR ADR, identified as 506 in FIG. 5B. Parcel K+1 is an example of a parcel arranged according to the invention. Like parcel K, parcel K+1 has an op code field, OP, a branch index field, BI, and a branch offset field, BO. Instead of a branch offset field 506, parcel K+1 has a branch-to address guess, BHAX, identified as 508 in FIG. 5B.

Each parcel in FIG. 5 has a size of thirty-two bits, with a typical VLIW having sixteen such parcels, or a total size of sixty-four bytes at eight bits per byte. The op code OP is a six bit field, while each of the branch index BI and branch offset BO are five bit fields. Both the branch address BR ADR and the branch-to guess BHAX are sixteen bit fields.

An update signal path 504 is provided between a branch-to real address branch-to real address register 424 and the L2/branch history Icache 502. In FIG. 5B, the update signal path 504 is depicted also as connecting to the parcel K+1, for simplicity of illustration.

Figure 6:
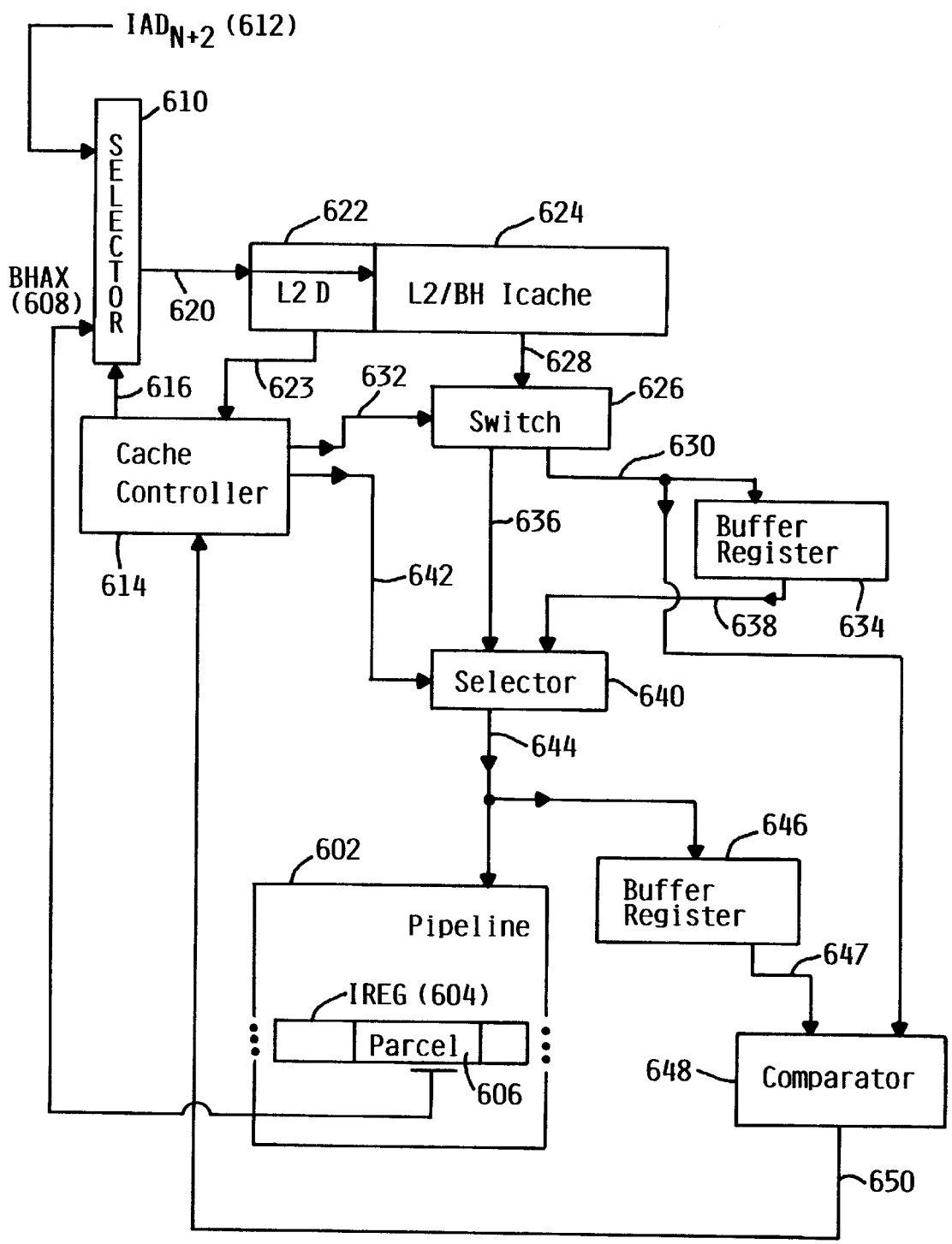
FIG. 6 depicts a verification circuit to be used with the alternative embodiment depicted in FIG. 6.

Structure of FIG. 6 Verification Circuit

In FIG. 6, one of the instruction registers, namely instruction register 604, in a pipeline 602 is depicted. The parcel in the instruction register 604 having the branch-to index guess is depicted as a parcel 606 the contents of which are connected to a selector 610 via a branch-to guess signal path 608. Another input to the selector 610 is the actual branch-to address $IAD_{N+2}$ provided on the actual branch-to signal path 612.

A control signal path 616 connects a cache controller 614 to the selector 616. An L2 input signal path 620 connects the selector 610 to each of an L2 directory 622 and a L2/branch history Icache 624, which is similar to the L2/branch history Icache 502. An L2 output signal path 628 connects the L2/branch history Icache 624 to a switch 626. A control signal path 632 connects the cache controller 614 to the switch 626.

A first switch output signal path 636 connects a selector 640 to the switch 626. A second switch output signal path 630 connects a buffer register 634 and a comparator 648 to the switch 626. A second selector input signal path 638 connects the buffer 634 to the selector 640. A control signal path 642 connects the cache controller 614 to the selector 640.

A selector output signal path 644 connects the selector 640 to the pipeline 602 and a buffer register 646. A buffer register output signal path 647 connects the buffer register 646 to the comparator 648. A comparator output signal path 650 connects the comparator 650 to the cache controller 614.

The operation of the embodiments will be described below.

Operation of First Embodiment

The operation of the first embodiment, depicted in FIG. 1, will now be described.

In a conventional cache system, when the processor needs a VLIW, it first accesses the lowest level of cache, namely level zero or L0 Icache, by providing the desired address, e.g., $IAD_N$, to the L0 Icache. If the L0 Icache suffers a miss, then the processor provides the desired address $IAD_N$ to the next higher level of Icache, namely level one or L1. If the L1 Icache suffers a miss, then the desired address $IAD_N$ is provided to the next higher level of Icache, namely L2.

The real address $IAD_N$ of the VLIW needed in stage 1 of the execution pipeline of the VLIW processor, referred to as the branching-from VLIW in the context of the invention, is provided to the history look-up table 102 over the branch-from signal path 104. The address $IAD_N$ on the branch-from signal path 104 is the same address used conventionally to access the next lower level of Icache. That is the real address $IAD_N$ is provided concurrently to the next lower level of Icache and the history look-up table 102.

Given that a branch history cache guess is historically based, in one cycle the history look-up table 102 outputs the address of a VLIW that was loaded into stage 1 two cycles after the most recent instance that the branched-from VLIW was in stage 1. The guess address is provided over the guess address signal path 114 to the branch history cache 116, which provides a corresponding guess VLIW over the guess VLIW signal path 119 to stage 1 of the processor's pipeline.

Concurrent with the access of the branch history cache 116, the branched-from VLIW in stage 1 of the processor's pipeline (not depicted in FIG. 1, but see FIG. 4) is executed, and if a branch is to be performed, an actual branch-to address is determined. The actual branch-to address $IAD_{N+2}$ 124 is the address that would be provided conventionally to a conventional L2 Icache as a result of a misses suffered by the lower levels of Icache. The actual branch-to address $IAD_{N+2}$ 124 is provided to the L2 directory 126 and to the selector 122 over the signal path 124. By default, i.e., where the branch-to guess on the branch-to signal path 114 is assumed to be a correct guess, the selector 122 selects the guess address on the guess address signal path 114.

If the L2 directory 126 determines that the VLIW corresponding to the address $IAD_{N+2}$ is stored in the L2 Icache 128, then the L2 directory will provide address $IAD_{N+2}$ on the directory output signal path 136 going to the comparator 140. If the comparator 140 determines that the guess address matches the actual branch-to address $IAD_{N+2}$, then the hit or miss signal, on the comparator output signal path 142, will indicate a hit, i.e., that the guess was correct. By the time the guess is evaluated as being correct, the guess VLIW corresponding to the guess address is available on the guess VLIW signal path 119.

By default, where the branch-to guess on the branch-to signal path 114 is assumed to be a correct guess, the selector 150 selects the guess VLIW on the guess VLIW signal path 119.

If the L2 directory 126 determines that the VLIW corresponding to the address $IAD_{N+2}$ is not stored in the L2 Icache 128, then the L2 directory will provide a value on the directory output signal path 136 that could not correspond to a real address, i.e., an impossible address value. If the comparator 140 indicates on the comparator output signal path 142 that the guess transmitted through the selector 122 does not match the value inputted via the directory output signal path 136, then the guess was wrong and the L2 Icache 128 must be accessed to determine if the L2 Icache 128 has the VLIW corresponding to the actual branch-to access $IAD_{N+2}$.

The cache controller 144 responds to an incorrect guess indicated on the comparator output signal path 142 by sending a control signal over control signal path 146 to the selector 122 to select the actual branch-to address $IAD_{N+2}$ for comparison against the signal from the L2 directory 126 that is provided over the directory output signal path 136.

If the actual branch-to address $IAD_{N+2}$ matches the signal on the path 136, then the comparator causes the signal on path 142 to indicate a hit, i.e., a conventional L2 Icache hit. In other words, in this circumstance, the guess was wrong but the L2 Icache 128 has the actual branch-to VLIW. In response to this hit, the cache controller 144 causes the selector 150 to select the VLIW on the Icache output signal path 134. After the VLIW on the Icache output signal path 134 has been made available as the selected VLIW on the selected VLIW signal path 154, the cache controller causes to the selectors 122 and 150 to reset to their default states, namely selector 122 selecting the branch-to guess on the guess address signal path 114 and selector 150 selecting the guess VLIW on the guess VLIW signal path 119.

If the actual branch-to address $IAD_{N+2}$ does not match the signal on the path 136, then the comparator causes the signal on path 142 to indicate a conventional miss, i.e., to indicate that the actual branch-to VLIW is not in the L2 Icache 128. In response to the comparison that follows an incorrect guess determination/comparison, the cache controller causes 146 the selector 122 to reset to its default state, namely selector 122 selecting the branch-to guess on the guess address signal path 114.

If there is a wrong guess but the actual branch-to VLIW is stored in the L2 Icache 129, then the history look-up table 102 is updated and a line in the branch history cache 116 is replaced. The branch-from address for which the guess was incorrect is located in the instruction address register (IAD) that is two stages farther down the pipeline from the stage having the instruction address register in which the actual branch-from address instruction address register$_{N+2}$ is located (the pipeline is not depicted in FIG. 1, but see FIG. 4).

If the actual branch-to address instruction address register$_{N+2}$ is located in stage J, then the branch-from address which caused the branch is located in stage J+2, identified as reference no. 105 in FIG. 1. To update the history look-up table 102, the cache controller causes, via the third control signal on the third control signal path 156, the selector 103 to connect the branch-from address stored in instruction address register(stage J+2) 105 to the look-up table input signal path 101 via the update signal path 106. Thus, the branch-from address of instruction address register (stage J+2) 105 becomes the index of the history look-up table 102.

At the same time that the history look-up table 102 is being indexed with the branch-from address of instruction address register(stage J+2) 105, the cache controller 144 enables, via the fourth control signal on the fourth control signal path 156, the history look-up table 102 to be writable such that the branch-from address of instruction address register(stage J+2) on the index signal path 101 via the update signal path 106 is written to the indexed branch-from field 110 and such that the actual branch-to address instruction address register$_{N+2}$ on the update signal path 124 is written to the indexed branch-to field 112 of the history look-up table 102.

After the history look-up table 102 has been enabled for writing for a sufficient time, i.e., after it has been updated, the cache controller causes, via the third and fourth control signals on the third and fourth control signal paths 156 and 158, the selector 103 and the history look-up table 102 to return to their default states. For the history look-up table 102, the default state is not being enabled for writing. For the selector 103, the default state is connecting the address instruction address register, on the branch-from signal path 104 to the index path 101.

If both the guess is wrong and there is a miss in the L2 Icache, not only does the L2 directory 126 get updated and the L2 Icache receive a replacement line in the conventional way, but the history look-up table 102 is updated as discussed above, and the branch history cache updated/line-replaced with the same VLIW that is loaded to the L2 Icache 128.

Initially, there will be no hits in the L2 Icache 128 until there have been enough misses that it has become filled via replacements. The same will be true for the history look-up table 102 and the branch history cache 116. Alternatively, there might be an initialization scheme used to preload the L2 Icache 128 before the pipeline begins initialization. The first time that an instruction is placed in the pipeline, the invention usually is less effective at reducing latency because there is no history available. With no history available, the BR-to data 112 from the history look-up table 102 is random data. The probability is very great that this random data will not match the actual branch-to address instruction address register$_{N+2}$, which will cause the indication of an incorrect guess. This is an expected result because no guess has been made. Thus, initially, the history look-up table 102 and the branch history cache would have to undergo a series of update/replacement processes, as discussed above, until a history has been established.

The technique of using a branch history cache never increases latency, and can significantly reduce latency if the guesses that it stores are correct. An ideal L1 Icache, which is closer to the pipeline than the L2 Icache 128, as well as being smaller and faster, is assumed to have a one cycle access time, for example. The branch history cache 116 and L2 Icache 128 are, e.g., assumed to have a three cycle access time equal to one cycle for the history look-up table 102 and the L2 directory 126, respectively, and two cycles to actually retrieve a VLIW from the branch history cache 116 and L2 Icache 128, respectively. Using the guess as to the branch-to VLIW address, the branch history cache 116 can be accessed at the same time as the L1 Icache, so that two cycles after a miss in the L1 Icache, a hit is made available from the branch history cache 116. If there had been a miss in the L1 Icache, and if the L2 Icache 128 had been accessed thereafter, a hit in the L2 Icache would be made available one cycle after the branch history cache hit was available.

In the embodiments of FIGS. 1 and 2, the guess is two cycles into the future. This is determined by how fast the L2 Icache is, namely it is assumed to take two cycles to access, for example. If the L2 Icache access time were, e.g., four cycles, then the guess would be four rather than two cycles ahead. It is noted that the further into the future the guess predicts, the lower the accuracy of the guess. Conversely, the less far into the future the guess predicts, the faster the branch history cache and associate circuitry must operate.

Operation of Second Embodiment

The operation of the second embodiment, depicted in FIG. 2, will now be described. The operation differs primarily in that the guess on the guess address signal path 202 is provided to the L2/branch history cache Icache 206, i.e., the virtual branch history cache, rather than to a physically distinct branch history cache. The L2 Icache provides both the guess VLIW and the actual branch-to VLIW, respectively, via the Icache output signal path 212.

Operation of Alternative History Look-up Table

The operation of the alternative implementation of the history look-up table, namely a four-way associative history look-up table 302 depicted in FIG. 3, will now be described. The number of sets, four, is a power of two, namely $2^k$ where k=2. If there are j entries in the set, then the first j bits, 0, . . . , j−1, select the entry within the set while bits j, . . . , j+k−1, or j and j+1, select the set within the array of sets.

The sets 0–3 provide the selected entire real addresses BR-from, or alternatively bits j and j+1 thereof, to the comparators 320–326, for comparison to actual input address instruction address register$_N$, or alternatively bits j and j+1 thereof, respectively. The outputs of the comparators 320–326 cause the selector 332 to select the real address BR-to 310 corresponding to the real address BR-from 308 matching the real address instruction address register$_N$. The BR-to real address 310 provided on the selector output signal path 350 corresponds to the BR-to real address 122 provided on the guess address signal path 114 of FIG. 1 and provided on the guess address signal path 202 of FIG. 2.

Operation of Third Embodiment

The operation of the third embodiment, depicted in FIG. 4, will now be described. FIG. 4 differs primarily from FIG. 2 in that the history look-up table 102 has been replaced by the use of the appended BHAX field 406, which can accommodate an entire real address. Alternatively, an abbreviated representation of an entire real address, i.e., an guess index, could be stored in the BHAX field 406.

When the VLIW is loaded into stage 1, the BHAX is also loaded. This eliminates the one cycle delay associated with a physically distinct history look-up table.

In default operation, i.e., where the branch to guess on the branch-to signal path 114 is assumed to be a correct guess, the BHAX 414 from the instruction register 410 of stage 1 is fed back to the L2/branch history 402 via the selector 444. The instruction address in the instruction address register 416 of stage 1 is fed to the branch address generator 420 which produces the actual branch-to real address and stores it in the branch-to real address register 424 of stage 2.

The branch-to real address branch-to real address register in stage 2 is compared by the comparator 440 against the corresponding guess BHAX located two stages farther down the pipeline at stage 4, i.e., two cycles earlier in time. If the two match, then the comparator output does not change, so that the selector 444 continues to select the guess address signal path 446 and pipeline execution continues based upon the guess VLIW. If the two do not match, then the guess incorrect, the L2/branch history Icache 402 must be accessed to determine if it has the actual branch-to VLIW at all, i.e., access in a conventional way. The cache controller 452 responds to the indication by the comparator 440 of the incorrect guess by controlling, via the control signal path 450, the selector 444 to connect the actual-branch-to signal path 428 to the index signal path 343, i.e., to select the actual branch-to address for the VLIW in stage 2.

Also, in the event of a miss, the L2/branch history Icache 402 must be updated. Upon determination of the miss, the cache controller 452 causes, via the second control signal path 454, the L2/branch history Icache 402 to be writable such that the actual branch-to address in stage 2 is written via the update input 438 into the BHAX field 406 corresponding to the branch-from address instruction address register in stage 4 provided via the WAD input 436. Writing of a new guess into the BHAX field 406 preferably can take place independently of writing a VLIW into the field 404.

The determination of an L2/branch history miss subsequent to an incorrect BHAX guess can be made either in a conventional manner, on in a manner similar to the determination for the second embodiment of FIG. 2. Hence, it will not be discussed further for the sake of brevity.

If the conventional access of the L2/branch history Icache 402, made subsequent to an incorrect guess, results in a miss, then a conventional reload of the L2/branch history Icache 402 takes place. The BHAX field 406 will have random data after the reload. Thus, immediately after the conventional reload, the BHAX field 406 must be initialized. The procedure for writing to the BHAX field 406 will be discussed below.

Operation of Alternative Implementation of Third Embodiment

An alternative implementation for the third embodiment of FIG. 4 is to use fewer than all the bits of a real address for the branch-to guess BHAX. It is noted that the BHAX identifies a VLIW in the L2/branch history Icache 402. A real address has bits that identify not only a location in a cache, but the also the full real address of a VLIW in main store. The identification of the main store real address in the VLIW or in the BHAX field is unnecessary given the presumption that the guess VLIW will be located in the L2/branch history Icache 402. In other words, a directory to access the guess VLIW is unnecessary because the BHAX is simply an index to an already existing VLIW in the L2 Icache, i.e., strictly a cache address, so the extra bits associated with such a directory are unnecessary. As an example, a 4 MB cache having 64 k lines would require only a 16 bit BHAX, rather than 40 bits if the full real address were used as the BHAX. This alternative implementation is applicable to the first and second embodiments of FIGS. 1 and 2. If a cache line becomes invalidated by a new line being written to the Icache, then the BHAXs associated with that cache line must be noted as being invalid, e.g., with a flag bit.

Operation of Alternative L2/branch History Icache

The operation of the alternative embodiment of the L2/branch history Icache, depicted in FIG. 5A, will now be described. FIG. 5A differs from FIG. 4 primarily in that the branch history cache functionality is carried out without the need for the appended BHAX field 406 of FIG. 4. The appended BHAX field 406 might necessitate the use of non-standard, i.e., customized, ICs, which is expensive. This necessity can be eliminated by manipulating the branching characteristics of the VLIW program.

For a VLIW having two or more branching parcels, it is convenient to require each of the branching parcels to branch to the same cache line. This requirement is carried out automatically by the program compiler.

Given that each VLIW has at least two branching parcels and that each of those parcels must branch to the same cache line, the invention is a recognition that each VLIW contains some redundant information. The storage space allocated to this redundant information can be used to carry out the branch history functionality, i.e., for the virtual branch history cache. Parcel K+1 of FIG. 5B, which is arranged according to the invention, replaces the redundant branch address index that would otherwise be stored in the field 508 with the BHAX field 508. The branch history is buried within the instruction stream causing the branch history to be inherently cached when the instructions are cached.

An entire branch-to guess real address could be represented if there were enough parcels with redundant branching information such that a real address could be represented using the total number of redundant bits available. However, it is unlikely that this many branching parcels with redundant branching information would be available. As such, it is preferred to represent the branching-to guess address as an index, e.g., BHAX 508 of FIG. 5B.

FIG. 5A depicts two parcels in a VLIW that branch. The sixteen byte field of the parcel K+1 that would otherwise hold the branch address BR ADR is now used to hold the BHAX guess. No information is lost because the branch address of parcel K+1 has been forced by the compiler to be the same as the branch address for the parcel K. If the BR ADR index was stored in the field 508 of the parcel K+1 instead of the BHAX guess, then this field would be, in effect, unused.

The VLIW processor can always find the BHAX guess because the op-code (of the parcel within which it is found) acts as a unique identifier. When the BHAX guess is updated in response to an incorrect branch-to guess in the field 508, as discussed above, the branch-to real address is written into the sixteen bit field of the parcel K+1 via the update signal path 504. The L2/branch history Icache 502 is arranged so that any of the parcels having a BHAX can be updated independently of a write operation to other parcels.

The alternative embodiment represented by the L2/branch history Icache in FIG. 5A eliminates the need for the additional branch history cache array of FIGS. 1 and 2, and the appended BHAX field 406 of FIG. 4. This confers an advantage in terms of chip surface area consumption, wireability, and associated signal-line-length-reduction performance enhancement.

When the BHAX guess is updated, the dirty bit is set. It must be remembered that an entry in the cache has a separate bit that identifies the information field as holding data or an instruction. Thus, the dirty bit and its associated purge-prior-to-replacement memory coherence protocol can now be used to preserve the coherence of the BHAX guess.

The alternative L2/branch history Icache embodiment of FIGS. 5A and 5B produces a pseudo self-modifying VLIW program code. The BHAX guess can be modified, but this is a field that is not recognized in VLIW computation as being a modifiable field. In other words, it is a field hidden from the scrutiny of those aspects of a VLIW machine that monitor changes to the VLIWs.

The embodiments are assumed to be on the same integrated circuit as the processor. An alternative implementation would be to locate the L2 Icache and the corresponding branch history cache, be it virtual or physically distinct, off the processor IC. This would add, e.g., a two cycle delay to the access time for the L2 Icache. Consequently, the guess associated with a VLIW in stage N of the pipeline would have to be the VLIW that would be in stage N four, rather than two, cycles later. Hence, a VLIW in stage N+4 would have a guess, e.g., a BHAX, used to load the VLIW in stage N.

Operation of FIG. 6 Verification Circuit

Using only a representation of a branch-to guess address requires the system to verify that the guess VLIW loaded to the pipeline is the same as the VLIW identified if there had been a conventional access to the L2/branch history Icache. This verification can be accomplished by comparing the guess VLIW against the VLIW retrieved based upon the conventionally derived L2 Icache address, as is depicted in FIG. 6.

The branch-to guess index in the parcel 606 of the instruction register 604 in one of the stages in the pipeline 602 is provided to the selector 610 via the branch-to signal path 608. By default, i.e., where the branch-to guess index BHAX on the branch-to signal path 608 is assumed to be a collect guess, the selector 122 selects the guess index BHAX. The selected input to the selector 620 is provided to the L2 directory 622 and the L2/branch history Icache 624 via the L2 input path 620.

A hit or miss based upon the branch-to guess is indicated by the L2 directory 622 to the cache controller 614 via the directory output signal path 623. In response to the branch-to guess, a guess VLIW is provided to the switch 626 via the switch input path 626. The cache controller 614 assumes that there is a hit in response to the branch-to guess. By default, i.e., where the guess VLIW is assumed to be a correct guess, the switch 626 switches the guess VLIW to the selector 640 over the selector input signal path 636. By default, i.e., where the guess VLIW is assumed to be a collect guess, the selector 640 connects the guess VLIW on the selector input signal path 636 to the pipeline 602 via the selector output signal path 644. The selector output signal path 644 also connects the guess to the buffer register 646, which temporarily stores the guess VLIW.

The L2/branch history Icache is also conventionally accessed to obtain the actual branch-to VLIW, which will be used to verify that the guess VLIW was a correct guess. The cache controller causes, via the control signal on the selector control path 616, the selector to connect the actual branch-to address instruction address register$_{N+2}$. This is supplied over the L2 input path 620 to the L2 directory 623 and the L2/branch history Icache 624.

Again, a hit or miss is indicated by the L2 directory 622 to the cache controller 614 via the directory output signal path 623. If there is a hit, the actual branch-to VLIW is provided to the switch 626 via the switch input path 626. Responsive to a hit based upon the actual branch-to address instruction address register$_{N+2}$, the controller causes, via the control signal path 632, the switch 626 to connect the actual branch-to VLIW to the buffer register 634 and the comparator 648 via the switch output signal path 630.

The comparator compares the guess VLIW from the buffer register 646 against the actual branch-to VLIW on the switch output path 630. If there is a match, then the cache controller 648 responds by permitting the pipeline to continue execution with the guess VLIW and resets the switch 628 and the selectors 620 and 640 to their default states.

If the comparator does not determine a match, then the guess was incorrect and the cache controller 648 causes the selector 640 to connect the actual branch-to address from the buffer register 634 to the pipeline 602. The execution by the pipeline based upon the incorrect guess VLIW must be discarded. The penalty is that the actual branch-to VLIW is provided one cycle later to the pipeline 602 than it would have been provided by a conventional Icache system.

An alternative used to verify the guess by comparing the guess VLIW against the VLIW retrieved based upon the conventionally derived L2 Icache address would be to compare the guess address against the conventionally derived L2 Icache address. This would require: generating an entire guess real address based upon the guess index BHAX; delaying the entire guess real address until the actual branch-to address becomes available; and comparing these addresses.

The embodiments have been described as being based upon real addressing. An alternative implementation is to base the system on virtual addressing, which is eventually translated, e.g., using translation look-aside buffers, into real addresses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim the following:

1. A cache system for a processor having a multi-stage execution pipeline, the system comprising:

a first cache for storing instructions that can be executed in said pipeline;

a virtual second cache for storing a subset of said instructions in said first cache; and a virtual history look-up table for storing a plurality of relations, each one of said relations relating a first instruction in said first cache to a second instruction in said second cache such that if said first instruction is in a stage of said pipeline then said second instruction is predicted to be needed in said stage of said pipeline a predetermined time later;

wherein said history look-up table is operable to represent said relations a plurality of entries, each one of said entries including an address of said first instruction and a branch-to indicator indicating an address of said instruction;

a directory for said first cache connected with said history look-up table and connected so as to receive an actual branch-to address from said pipeline, said directory being operable to provide an output equal to said actual branch-to address if a corresponding branch-to instruction is stored in said first cache, and being operable to set said output equal to a third signal indicating that no instruction corresponding to said actual branch-to address is stored in said first cache if said corresponding branch-to instruction is not stored in said first cache;

a comparator for comparing a guess represented by one of said branch-to address indicators with output from said directory, said comparator indicating a correct guess if said guess matches said output from said directory and an incorrect guess if said guess does not match said output from said directory; and a selector, connected between said history look-up table and said comparator and connected to receive said actual branch-to address, for selecting either said guess or said actual branch-to address;

said comparator also being operable to compare said actual branch-to address with said output from said directory, said comparator being operable to provide an output indicative of a hit if said actual branch-to address matches said output from said directory, and being operable to provide an output indicative of a miss if said actual branch-to address does not match said output from said directory.

2. A cache system for a processor having a multi-stage execution pipeline, the system comprising:

a first cache for storing instructions that can be executed in said pipeline;

a virtual second cache for storing a subset of said instructions in said first cache; and a virtual history look-up table for storing a plurality of relations, each one of said relations relating a first instruction in said first cache to a second instruction in said second cache such that if said first instruction is in a stage of said pipeline then said second instruction is predicted to be needed in said stage of said pipeline a predetermined time later;

wherein said processor is a very long instruction word (VLIW) processor and said first and second instructions are VLIWs;

wherein each of one said VLIWs includes a plurality of parcels;

wherein at least a first and a second one of said parcels in each one of said VLIWs are conditionally branching parcels that branch to said second instruction;

wherein each one of said parcels having a plurality of fields including a multipurpose field;

wherein said multipurpose field in first parcel storing a branch-to address indicator pointing toward a third instruction to which said first instruction conditionally will branch; and wherein said multipurpose field in said second parcel storing a branch-to guess address indicator indicating an address of said second instruction.

3. The system of claim 2, wherein said pocessor is a very long instruction word (VLIW) processor and said instruction are VLIWs.

4. The system of claim 2, wherein said first cache is four-way associative.

5. The system of claim 4, wherein said second cache is four-way associative.

6. The system of claim 2, wherein said predetermined time is one of two cycles and four cycles.

7. The system of claim 2, wherein said first cache has a plurality of entries, each entry having a first portion for said first instruction and a second portion for a branch-to address indicator pointing to said second instruction predicted to be needed in said stage of said pipeline said predetermined time later.

8. The system of claim 7, wherein said second portions can be written to independently of said first portions such that, for a given first instruction, a new branch-to address indicator independently can be stored in said second portions to replace an old branch-to address indicator and so reflect a revised prediction.

9. The system of claim 8, wherein said second portion stores an entire real address as said branch-to address indicator.

10. The system of claim 8, wherein a basic unit of storage in said first cache is a line, and said second portion is sized to store only as many bits as are necessary to uniquely identify one of said basic units of storage in said first cache.

11. The system of claim 2, wherein said multipurpose fields can be written to independently such that, for a given first instruction, a new branch-to address indicator independently can be stored in said second field to replace an old branch-to address indicator and so reflect a revised prediction.

12. The system of claim 11, wherein a basic unit of storage in said first cache is a line, and said multipurpose fields are sized to store only as many bits as are necessary to uniquely identify one of said basic units of storage in said first cache.

13. The system of claim 2, wherein said predetermined time corresponds to an access time of either an L1 or an L2 cache.

14. A method for caching instructions for a processor having a multi-stage execution pipeline, the method:

storing, as a first cache, a main set of instructions that can be executed in said pipeline;

storing, as a virtual second cache, a subset of said instructions stored in said first cache;

storing, as a virtual history look-up table, a plurality of relations, each one of said relations relating a first instruction in said first cache to a second instruction in said second cache such that if said first instruction is in a stage of said pipeline then said second instruction is predicted to be needed in said stage of said pipeline a predetermined time later;

wherein the branch history information is not stored at locations physically distinct from locations where said main set of instructions is stored due to being located in fields of instructions in said main set that would otherwise contain redundant information;

representing said relations as a plurality of entries in said history LUT, each one of said entries including an address of said first instruction and a branch-to address indicator indicating an address of said second instruction;

receiving an actual branch-to address from said pipeline;

providing a directory output equal to said actual branch-to address if a corresponding branch-to instruction is stored in said first cache, and equal to a third signal if said corresponding branch-to instruction is not stored in said Icache;

comparing a branch-guess represented by one of said branch-to address indicators with said directory output;

providing an output indicative of a correct guess if said guess matches said output from said directory, and an output indicative of an incorrect guess if said guess does not match said output from said directory;

selecting either said branch-guess or said actual branch-to address for said step of comparing;

comparing said actual branch-to address with said output from said directory; and indicating a hit if said actual branch-to address matches said output from said directory and a miss if said actual branch-to address does not match said output from said directory.

15. A method for caching instructions for a processor having a multi-stage execution pipeline, the method:

storing, as a first cache, a main set of instructions that can be executed in said pipeline;

storing, as a virtual second cache, a subset of said instructions stored in said first cache;

storing, as a virtual history look-up table, a plurality of relations, each one of said relations relating a first instruction in said first cache to a second instruction in said second cache such that if said first instruction is in a stage of said pipeline then said second instruction is predicted to be needed in said stage of said pipeline a predetermined time later;

wherein the branch history information is not stored at locations physically distinct from locations where said main set of instructions is stored due to being located in fields of instructions in said main set that would otherwise contain redundant information;

wherein said processor is a very long instruction word (VLIW) processor and said first and second instructions are VLIWs;

wherein each of one said VLIWs includes a plurality of parcels;

wherein at least a first and a second one of said parcels in each one of said VLIWs are conditionally branching parcels that branch to said second instruction;

wherein each one of said parcels having a plurality of fields including a multipurpose field;

storing a branch-to address indicator, pointing toward an address of a third instruction to which said first instruction conditionally will branch, in said multipurpose field of said first parcel; and storing a branch-to guess address indicator, indicating an address of said second instruction, in said multipurpose field of said second parcel.

16. The method of claim 15, wherein said processor is a very long instruction word (VLIW) processor and said instructions are VLIWs.

17. The method of claim 15, wherein said main set of instructions is stored so as to be four-way associatively searchable.

18. The method of claim 17, wherein said subset of instructions is stored so as to be four-way associatively searchable.

19. The method of claim 15, wherein said predetermined time is one of two cycles and four cycles.

20. The method of claim 15, wherein said plurality of relations is stored at locations that are physically distinct from locations at which said main set of said instructions is stored.

21. The method of claim 15, wherein said first cache is organized as entries, each entry having a first portion for said first instruction and a second portion for a branch-to address indicator pointing to said second instruction predicted to be needed in said stage of said pipeline said predetermined time later.

22. The method of claim 21, further comprising writing data into said second portions independently of writing data to said first portions such that, for a given first instruction, a new branch-to address indicator independently can be stored in said second portion to replace an old branch-to address indicator and so reflect a revised prediction.

23. The method of claim 22, wherein said second portion stores an entire real address as said branch-to address indicator.

24. The method of claim 23, wherein a basic unit of storage in said first cache is a line, and said second field portion is sized to store only as many bits as are necessary to uniquely identify one of said basic units of storage in said first cache.

25. The method of claim 15, further comprising:

writing to said multipurpose fields independently such that, for a given first instruction, a new branch-to address indicator independently can be stored in said second field to replace an old branch-to address indicator and so reflect a revised prediction.

26. The method of claim 25, wherein a basic unit of storage in said first cache is a line, and said multipurpose fields are sized to store only as many bits as are necessary to uniquely identify one of said basic units of storage in said first cache.

27. The method of claim 15, wherein said predetermined time corresponds to an access time of either an L1 or an L2 cache.

28. A cache system for a processor having a multi-stage execution pipeline, the system comprising:

a first cache for storing instructions that can be executed in said pipeline;

a second cache for storing a subset of said instruction in said first cache; and a history look-up table for storing a plurality of relations, each one of said relations relating a first instruction in said first cache to a second instruction in said second cache such that if said first instruction is in a stage of said pipeline then said second instruction is predicted to be needed in said stage of said pipeline a predetermined time later;

and wherein said second cache is real or virtual;

said history look-up table is not physically distinct from said first cache, rather said history look-up table is a virtual look-up table;

said processor is a very long instruction word (VLIW) processor and said first and second instructions are VLIWs;

each of one said VLIWs includes a plurality of parcels;

at least a first and a second one of said parcels in each one of said VLIWs are conditionally branching parcels that branch to said second instruction;

each one of said parcels having a plurality of fields including a multipurpose field;

said multipurpose field in first parcel storing a branch-to address indicator pointing toward a third instruction to which said first instruction conditionally will branch; and said multipurpose field in said second parcel storing a branch-to guess address indicator indicating an address of said second instruction.

29. The system of claim 28, wherein said multipurpose field can be written to independently such that, for a given first instruction, a new branch-to address indicator independently can be stored in said second field to replace an old branch-to address indicator and so reflect a revised prediction.

30. The system of claim 29, wherein a basic unit of storage in said first cache is a line, and said multipurpose fields are sized to store only as many bits as are necessary to uniquely identify one of said basic units of storage in said first cache.

31. A method for caching instructions for a processor having a multi-stage execution pipeline, the method comprising:

storing, as a first cache, a main set of instructions that can be executed in said pipeline;

storing, as a second cache, a subset of said instructions stored in said first cache; and storing, as a real or virtual history look-up table (look-up table), a plurality of relations, each one of said relations relating a first instruction in said first cache to a second instruction in said second cache such that if said first instruction is in a stage of said pipeline then said second instruction is predicted to be needed in said stage of said pipeline a predetermined time later;

and wherein said main set of said instructions is not stored at location physically distinct from locations where said plurality of relations is stored, rather said history look-up is a virtual array;

said processor is a very long instruction word (VLIW) processor and said first and second instructions are VLIWs;

each of one said VLIWs includes a plurality of parcels;

at least a first and a second one of said parcels in each one of said VLIWs are conditionally branching parcels that branch to said second instruction;

each one of said parcels having a plurality of fields including a multipurpose field;

storing a branch-to address indicator, pointing toward an address of a third instruction to which said first instruction conditionally will branch, in said multipurpose field of said first parcel; and storing a branch-to address indicator, indicating an address of said second instruction, in said multipurpose field of said second parcel.

32. The method of claim 31, further comprising:

writing to said multipurpose fields independently such that, for a given first instruction, a new branch-to address indicator independently can be stored in said second field to replace an old branch-to address indicator and so reflect a revised prediction.

33. The method of claim 32, wherein a basic unit of storage in said first cache is a line, and said multipurpose fields are sized to store only as many bits as are necessary to uniquely identify one of said basic units of storage in said first cache.

* * * * *